Sept. 7, 1965 G. DAVID 3,204,902
CLAMPING DEVICE FOR SECURING A DRAIN HOSE
Filed July 15, 1964 2 Sheets-Sheet 1
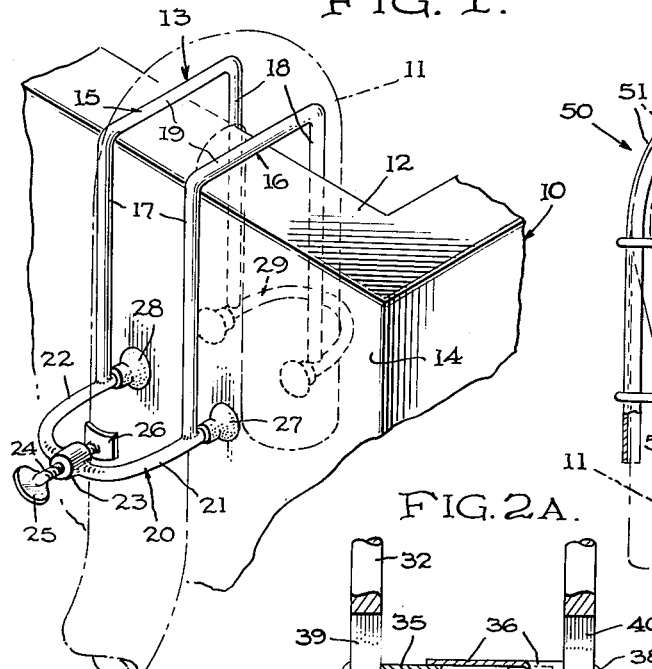
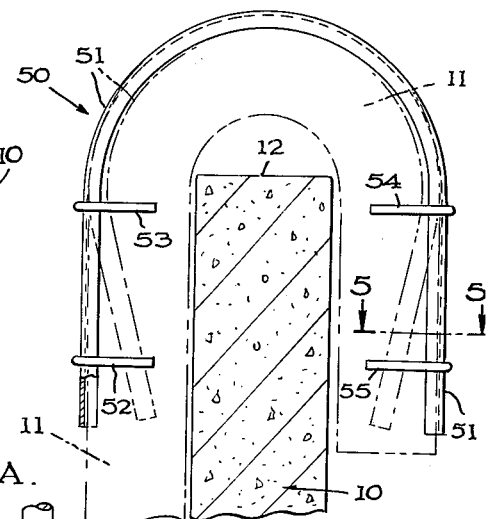
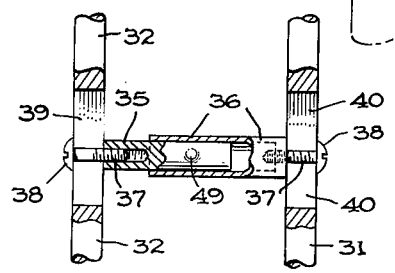
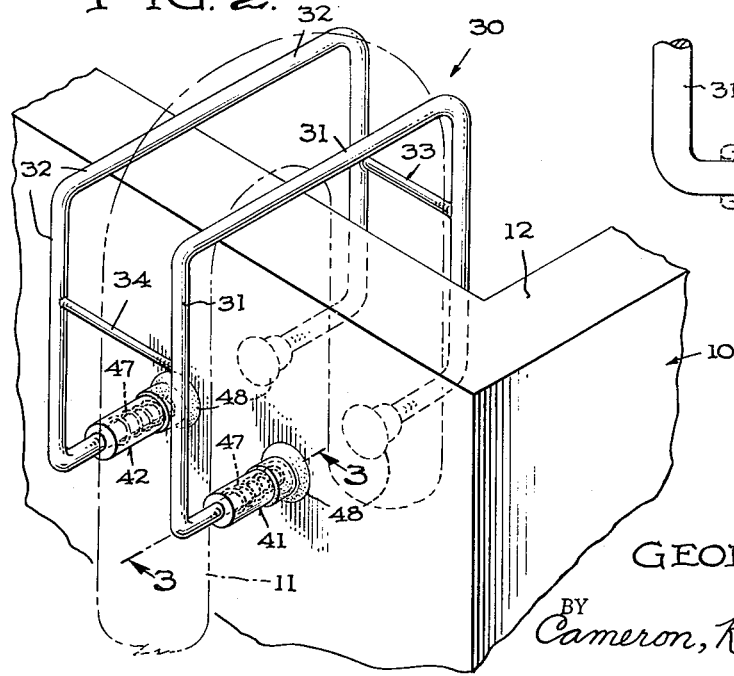
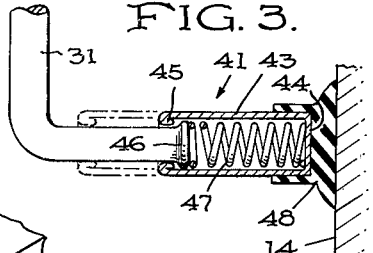
INVENTOR
GEORGE DAVID
BY Cameron, Kerkam & Sutton
ATTORNEYS Sept. 7, 1965 G. DAVID 3,204,902
CLAMPING DEVICE FOR SECURING A DRAIN HOSE
Filed July 15, 1964 2 Sheets-Sheet 2
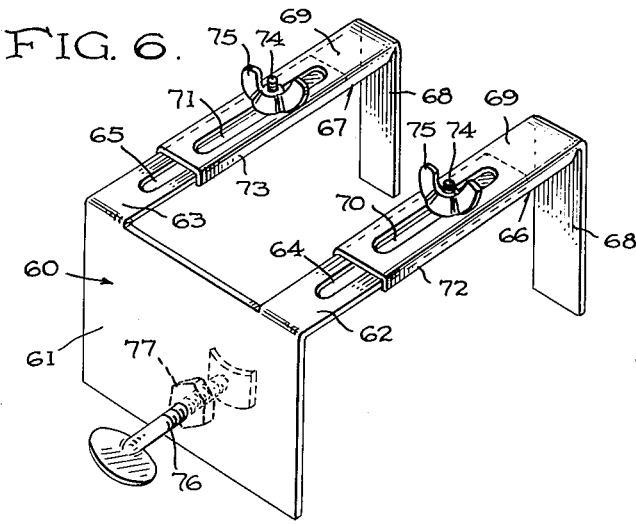
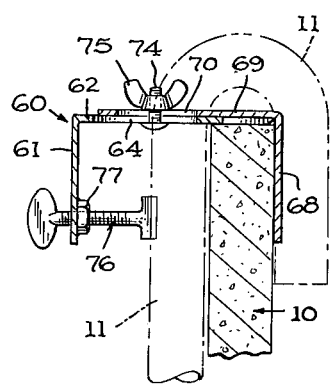
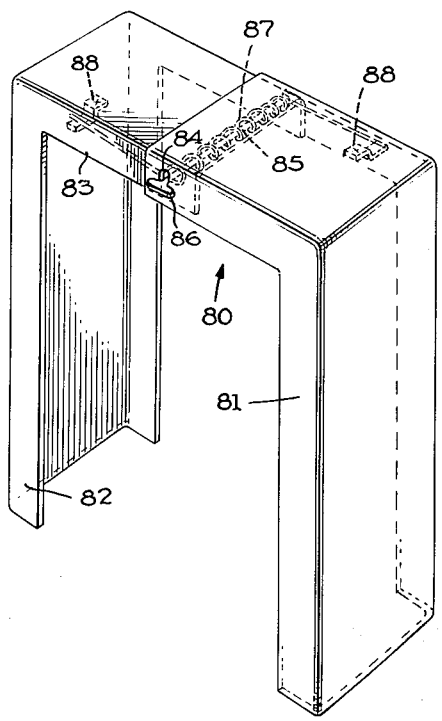
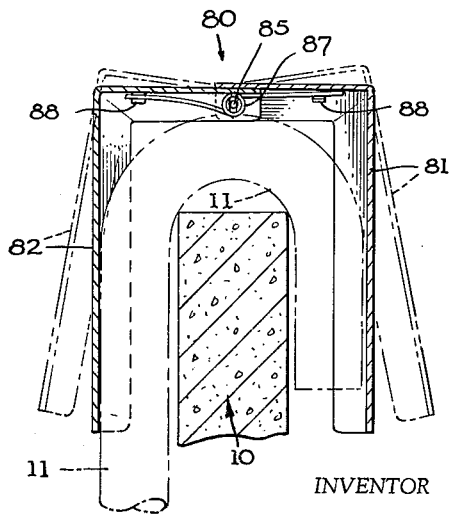
INVENTOR
GEORGE DAVID
BY
Cameron, Kerkam & Sutton
ATTORNEYS

United States Patent Office 3,204,902
Patented Sept. 7, 1965

3,204,902
CLAMPING DEVICE FOR SECURING
A DRAIN HOSE
George David, 1447 W. Thome, Chicago, Ill.
Filed July 15, 1964, Ser. No. 382,745
6 Claims. (Cl. 248—79)

The present invention relates generally to clamping devices and more particularly to a clamping device adapted to secure the end of a drain hose to a fixed surface area over which the hose is draped.

In many household washing installations of either the permanent or portable type, the drain hose of the washing machine is conveniently draped over the ledge of a washtub, sink, pipe drain or the like, which catches the water drained from the tub of the washing machine. In such installations, the force of the water being siphoned from the washing machine or the vibrations of the washing machine often causes the hose to be displaced from the ledge resulting in a considerable amount of spillage on the working area and much grief and consternation for the housewife.

Accordingly, it is desirable to provide some means for effectively clamping the end of the drain hose to the ledge or fixed surface area over which the hose is draped. While many known clamping devices are available in the prior art, these devices generally require that the clamp be permanently nailed, screwed or bolted to a surface area on which the clamped article is positioned. It can be readily appreciated that water drainage pipe, wash basins or tubs are not readily susceptible to the use of nails, screws or bolts due to either the leakage which results therefrom or the marring of the surface area.

One form of hose clamp which has been found to be suitable for use in such environments is the type described in my copending application Serial No. 345,360, in which there is provided a U-shaped steel rod having a rubber suction cup attached at each end of the rod which cups are adapted to be pressed down firmly against the fixed surface area of the washtub with the rod being placed over the extreme end of the hose to hold it in place. However, this type of clamp is generally utilized inside the tub and is frequently in contact with hot wash water so that the rubber suction cup legs are subject to rapid deterioration. Also, should any water leak under the suction cup, the suction is quickly lost and the clamp falls off.

In accordance with the present invention, the disadvantages of the prior art structures are overcome by a relatively simple and effective clamping device which clamps the drain hose to the fixed surface area over which the hose is draped. The clamping device is substantially U-shaped so as to extend adjacent the drain hose on both sides of the fixed surface area and over the fixed surface area whereby the hose is clamped securely in place. Also, the clamping device is provided with adjustable tensioning and adjusting means to selectively vary the clamping force and alter the size of the clamp to accommodate various size hoses and various width installation surfaces.

Accordingly, it is a primary object of the present invention to provide an improved clamping device for securing a drain hose to a fixed surface area over which the hose is draped.

Another object of the present invention is to provide an improved clamping device for securing a drain hose to a fixed surface area over which the hose is draped without the need of nailing, screwing or bolting the device to or against the surface it rests on.

A further object of the present invention is to provide an improved clamping device for securing a drain hose to a fixed surface area over which the hose is draped, which clamping device is readily adjustable to accommodate hoses of various sizes.

Another object of the present invention is to provide an improved clamping device for securing a drain hose to a fixed surface area over which the hose is draped, which clamping device is readily adjustable to vary the holding force on the hose.

Still a further object of the present invention is to provide an improved clamping device for securing a drain hose in various angular positions to a fixed surface area over which the hose is draped.

Yet another object of the present invention is to provide an improved clamping device for securing a drain hose to a fixed surface area over which the hose is draped, which clamping device is relatively inexpensive to manufacture, embodies a minimum of parts and has a simple, rugged construction.

In one embodiment of the invention herein illustrated and described, by way of example, the invention is applied to secure the end of a drain hose over the edge of a tub over which the hose is draped. To this end, there is provided a substantially U-shaped bracket adapted to encompass the hose. To this end, the bracket comprises leg portions which are positioned on opposite sides of the fixed surface area and adjacent each side of the hose. A suitable force adjusting means, supported by the U-shaped member, is arranged to bear against the hose to secure it to the fixed surface over which the hose is draped.

Although several specific embodiments of the invention are described and illustrated in the drawings, wherein like numerals refer to like parts in the several views, it is to be expressly understood that these drawings are for the purpose of illustration only and are not intended to represent the full scope of the invention. Other embodiments of the present invention will appear to those skilled in the arts from the following detailed description of the mechanical structure and mode of operation thereof and, while the specification concludes with claims particularly pointing out and distinctly claiming the subject matter of the invention, it is believed the invention will be better understood from the following description thereof taken in connection with the accompanying drawings.

FIGURE 1 is a perspective view of the clamping device of the present invention;

FIGURES 2 and 2A illustrate alternate embodiments of the clamping device of the present invention;

FIGURE 3 is an end view, partially in cross-section, of the bracket-type clamping device of FIGURE 2 taken along line 3—3;

FIGURE 4 is an alternate embodiment of the clamping device of the present invention;

FIGURE 5 is a partial plan view of the clamping device of FIGURE 4 taken along line 5—5;

FIGURE 6 is an alternate embodiment of the clamping device of the present invention;

FIGURE 7 is a partial side view, partially in cross-section, of the clamping device of FIGURE 6;

FIGURE 8 is a perspective view of an alternate embodiment of the present invention; and FIGURE 9 is a partial side view, partially in cross-section, of the clamping device shown in FIGURE 8.

Referring to the drawings, the numeral 10 generally designates the fixed surface area of a washtub or basin over which the drain hose 11 from a pump of a washing machine or the like (not shown), is connected. The drain hose 11 may be formed of a composition product, rubber, plastic, or any other suitable material. In most conventional installations, the drain hose 11 is conveniently draped over the ledge 12 of the washbasin 10 so that its end is directed to discharge water or other liquid into the washtub 10. However, the present invention is equally well adapted to accommodate those drain hoses which are pre-formed in a well known manner in the shape of a hook or U at one end which is draped over the washtub ledge 12.

Referring to FIG. 1, there is illustrated one embodiment of the present invention in which drain hose 11 is secured to the outside surface area 14 of the washtub 10 by means of a substantially U-shaped clamping device 13. Clamping device 13 is adapted to encompass the hose 11 and extends on both sides of the fixed surface area of the washtub 10, and is formed from one or more metal rods. However, to give rigidity to the clamping device 13, it is preferably formed, as illustrated in FIGURE 1, from a pair of metal rods 15 and 16 circular in cross-section and which are bent in a U shape. In the alternative the rods may be formed of separate segments arranged in a U shape comprising vertically extending legs 17 and 18 joined by a horizontally extending connecting member 19.

Each of the rods 15 and 16 are identical, thus like parts have been similarly designated. In the operative position of the clamping device 13, the rods 15 and 16 are placed so that legs 17 are external and in front of the washtub while legs 18 lie inside of the washtub. The opposite legs 17, 18 and connecting members 19 are positioned adjacent, but on opposite sides of the drain hose 11.

The lower ends of vertical legs 17 are connected by a cross-piece 20 formed from a pair of curved rod sections 21 and 22 which are similar in cross-section to that of the rods. One end of each of the curved sections 21 and 22 is supported and joined by an internally threaded collar 23 which supports, in threaded engagement therewith, an adjusting bolt 24. Adjusting bolt 24 supports, at one end thereof, a butterfly handle 25 used for turning the bolt 24 so as to adjust the holding force on the drain hose 11 and firmly secure the drain hose to the fixed surface area over which it is draped.

Affixed to the other end of bolt 24 is a distributing plate 26 which is freely rotatable and held in suspension by beveling the bolt 24 on opposite sides of the distributing plate 26 in a manner well known in the art. The distributing plate 26 is curved to conform to the shape of the hose so as to distribute the holding force over the entire area of the distributing plate. It can be readily appreciated, that since the hose 11 is generally constructed of a material which is soft relative to the metal bracket, any concentrated point forces from the adjusting mechanism could easily serve to puncture the hose. Thus, the distributing plate 26 avoids the possibility of such punctures and, in addition, since it is freely rotatable about the axis of the bolt 24, it can be positioned in a plane perpendicular to the axis of the bolt 24 to accommodate various angular positions of the hose 11.

Each end of the curved rods 21 and 22 of the cross-piece 20 supports a resilient bumper leg 27 and 28, respectively, which may be rubber, plastic, or the like. The bumper legs 27 and 28 are firmly secured on the ends of the rods 21 and 22 for positioning against the fixed surface area 14 to prevent chipping, marring, or scratching of the surface area 14 when the bracket is in position. A cross-piece 29 similar to that of cross-piece 20 is provided on the inside of the washtub 10; however, if desired, the holding force adjusting mechanism for firmly clamping the hose to the wall of the tub may be eliminated. This is often desirable in situations where the drain hose is placed into a drain pipe of small internal diameter, since it would be difficult in such situations to adjust such a tensioning device were it provided.

The operation of the clamping device of the present invention is relatively simple. The drain hose 11 is draped over the ledge 12 of the washtub 10 and the U-shaped bracket 13 is slipped over the drain hose 11 so as to encompass the hose. The adjustable vice type tensioning device is moved inwardly on the hose 11 by turning the threaded bolt 24 by its butterfly handle 25 clockwise. As the bolt 24 is adjusted inwardly, the force distributing plate 26 is caused to exert a pressure against the drain hose 11 and secures the hose firmly against the fixed surface area 14 through the opposing combined forces of the rubber tipped legs of the inner cross-piece 29 bearing against the inner vertical surface of the washtub 10 through rods 15 and 16 and back to the cross-piece 20 on the other side of the washtub 10 and its rubber tipped legs 27 and 28 which bear against the opposite vertical tub surface 14. The drain hose 11 is thus kept secured tightly against the vertical tub surfaces and prevents the drain hose 11 from shifting out or away from its placed position in the washtub 10.

Referring to FIGURE 2, there is illustrated an alternate embodiment of the present invention in which the clamping device 30 comprises a pair of metal rods 31 and 32 bent in a substantially U shape. Clamping device 30 may also be visualized as being substantially square shape and open at one side thereof to permit positioning of the clamping device 30 over the fixed surface area of the washtub 10. Each of the rods 31 and 32 are joined on opposite sides of the fixed surface area of the washtub 10 by cross-pieces 33 and 34 which serve to reinforce the assembly and also provide suitable spacing between the rods. Cross-pieces 33 and 34 are secured to the rods 31 and 32 by welding or the like; however, if desired, the cross-pieces may be arranged for vertical adjustment by providing slots or channels within the rods with which the cross-pieces slidingly engage. Also, the spacing between rods 31 and 32 may be varied to accommodate hoses of various sizes by making the cross-pieces 31 and 32 adjustable along the horizontal axis. Such an arrangement can be accomplished by forming each of the cross-pieces of two parts in telescopic engagement.

FIG. 2A illustrates, in partial view, one such suitable adjusting arrangement. The standard cross-piece 34 of FIG. 2 is formed of two sections 35 and 36. Section 36 is hollow and has a diameter slightly greater than that of section 35 such that section 35 may be slidingly positioned within section 36. The parts are thus in telescopic engagement. Each end of sections 35 and 36 are provided with internal threads for receiving bolts 37 which extend through slots 39 and 40 in rods 32 and 31, respectively. The outer ends of bolts 37 which extend beyond the rods 31 and 32 are capped as at 38 and may be conveniently slotted for adjustably securing the cross-pieces along the vertical rod members. To secure sections 35 and 36 from being displaced due to vibrations, section 35 may be provided with raised portion 49 which engages spaced indentations (not shown) on section 36.

For securing the hose 11 to the fixed surface area of the washtub 10 over which the hose is draped, referring again to FIG. 2, there is provided on at least one open end of each rod 31 and 32 a spring tensioning device 41 and 42, respectively. Each of the tensioning devices 41 and 42 are identical in construction and operation, thus the description of the tensioning devices will be limited for simplicity only to the arrangement on rod 31 identified by numeral 41 and illustrated in detail in FIG. 3. The spring tensioning device 41 comprises a hollow tubular cup 43 which is closed at one end as at 44. The open end of the tubular cup fits over the rod 31 and is flared inwardly to provide a stop 45. The end of the rod 31 over which the tubular cup 43 is supported is beveled to provide a rim 46 which cooperatively engages the stop 45 of the hollow tubular cup 43 to limit travel of the tubular cup in one direction. A suitable compression spring 47 is supported within the tubular cup 43. Each tubular cup 43 supports at its closed end a resilient bumper leg 48, similar to the bumper legs shown in FIGURE 1, which bears against the fixed surface area 14 of the washtub 10. Similar bumper legs are provided on all open ends of the rods to prevent marring and chipping of the washtub surfaces.

In operation, the holding force of the tensioning device is created by the springs 47 which are compressed as the holding bracket 30 is slipped downward over the hose 11. The hose 11 extends between the rods 31 and 32 of the clamping device 30 and is pressed against the surface area of the washtub 10 along the external and internal vertical walls by cross-piece members 33 and 34. The springs 47 exert two forces, one against the open legs of the rods 31 and 32, the other against the closed ends of the tubular cups which support the rubber bumper legs 48 which bear against the fixed surface area of the washtub 10. The counter force of the springs 47 is carried by the rods 31 and 32 to their opposite leg ends and rubber bumpers that rest on opposite sides of the tubs. The rubber bumpers provide better friction against the vertical surfaces of the washtub 10 and also keep the metal bracket from marring or chipping the finish of the washtub.

Referring to FIGS. 4 and 5, there is illustrated another embodiment of the present invention in which a clamping device 50 comprises a rod 51 of flexible material which may be spring steel or the like. The rod 51 is preferably semi-circular in cross-section and is substantially U shaped. Rod 51 is made long enough so as to extend on both sides of the washtub 10 and over the drain hose 11 which is draped across the ledge 12.

The U-shaped rod 51, in its normal position, is bowed inwardly so that the lowermost portion of its arms, as shown by the dotted lines in FIG. 4, are convergent. Two or more curved holding rings 52–55, four of which are shown in the illustrated embodiment, are provided on opposite sides of the flexible rod 51. The curved holding rings 52–55 are preferably semi-circular in cross-section and welded or fastened by other suitable means at spaced intervals along the vertically extending legs of the flexible rod 51.

In operation, the flexible rod 51 is bowed outward by manual force and placed so as to encompass the drain hose 11. The flexible tension of the rod 51 provides the holding force for the drain hose 11 and firmly secures the hose on both sides of the washtub 10 to the fixed vertical surface of the washtub. Rings 52–55 are contoured to the shape of the drain hose and prevent the rod 51 from slipping.

Referring to FIGURES 6 and 7, there is illustrated an adjustable clamping device adapted to accommodate surface areas of varying width. To this end, there is provided a fork-type right angle bracket 60 having a vertically extending surface 61 adapted to be positioned on the outside wall 14 of the washtub 10 and a horizontally extending surface adapted to be positioned over the ledge of the washtub. The horizontal extending surface is preferably cut away at its center to form two extending horizontal arm members 62 and 63. Each arm member 62 and 63 is provided with an elongated slot 64 and 65, respectively along its length. A pair of cooperating right angle brackets 66 and 67 are provided, each having a vertically extending surface or arm 68 adapted to extend on the inner side of the washtub 10, and a horizontally extending surface or arm 69 adapted to extend adjacent the ledge 12 of the washtub 10 and over the horizontally extending arm members 62 and 63.

The horizontal arms 69 of the right angle brackets 66 and 67 are provided with centrally disposed elongated slots 70 and 71 while their ends are flanged downwardly as at 72 and 73 to form channels so that the brackets 66 and 67 slide over the horizontally extending arm members 62 and 63, respectively, of bracket 60. The elongated slots 64, 65 and 70, 71 are adapted to be positioned one over the other and adapted to be locked by suitable fastening means such as, for example, bolt 74 and wing nut 75 which firmly, but adjustably secure the arms of the right angle bracket 60 to the horizontally extending arms 69.

A tensioning device 76 similar to that provided with the clamping device illustrated in FIG. 1 and hereinbefore described is supported on surface 61 with the small modification that in place of the collar 23 used to join the two arm members 21 and 22, the vertical surface 61 is bored and a suitable collar or hexagon nut 77 or the like is welded on the inside of the vertical surface to threadingly receive the bolt.

As clearly shown in FIG. 7, the vertical arm members 68 of the right angle brackets 66 and 67 are placed snugly against the inside wall of the washtub 10. The horizontally extending arm members are placed in overlying relationship and adjusted to the desired spacing. The bolt 74 and locking nut 75 maintains the parts locked in the desired position while tensioning device 76 provides the adjustable holding force on the hose 11. If desired, a suitable protective sleeve (not shown) of soft material may be placed over arm members 68 to protect the finish of the washtub.

Referring to FIGURES 8 and 9, there is illustrated a spring-type holding bracket 80 including a pair of right angle channel brackets 81 and 82. Right angle channel bracket 81 is made slightly wider in width than right angle channel bracket 82 so that the bracket 81 may be slid over the end of the horizontal extending arm 83 of the right angle channel bracket 81.

Each channel bracket 81 and 82 is provided with a pair of aligned holes 84 in each side. A shaft 85 is positioned through the holes to hold the brackets in their assembled position forming a substantially U-shaped bracket. The shaft 85 may be flattened or crimped at its outer ends as at 86 to keep it from sliding out of place. A tension spring 87 is wound in position and supported on the shaft 85. One end tension spring 87 is connected to the right angle bracket 81 in any suitable manner, as for example by tab 88, which is punched out of the bracket. The other end of spring 87 is similarly connected on the opposite side of the right angle bracket 82.

The right angle channels 81 and 82 are held closed by the spring 87 which is wound in a reverse binding position prior to installing the spring 87 on the U-shaped bracket 80. To clamp the hose 11 in position, the right angle channels 81 and 82 are spread apart manually by exerting an outward force on each channel. The channels are then placed over the hose 11 which is draped over the washtub 10. The long vertical sections of the channel encompass the drain hose, one on each side of the washtub, and the spring tension forces cause the channels to close firmly over the hose by pivoting about the shaft 85 which extends through the aligned openings 84 in the sides of the channels.

There has thus been described several embodiments of the clamping device forming the subject matter of the present invention, all of which are adapted to efficiently and effectively secure the end of the drain hose to a fixed surface area over which the hose is draped. Such a clamping device prevents the drain hose from being accidentally deflected from the washtub or drain area. However, it will be obvious to those skilled in the art that the inventive concept is capable of a variety of mechanical modifications.

For example, the clamping device of the present invention can be utilized in various installations, including household, commercial and industrial installations where it is desired to secure a hose to a fixed surface area for either pumping or siphoning of all types of materials. Also, although the invention has been described with relation to a drain hose secured to the outer surface of a washtub, it should be readily apparent that the versatile clamp of the present invention can support a hose to the inner surface of any suitable tank, tub, pipe or the like. It is, therefore, intended by the appended claims to cover all such modifications which come within the true spirit and scope of the invention.

What is claimed is:

1. A clamping device adapted to secure the permanently hooked end of a molded rubber drain hose to a fixed surface area over which the hose is draped comprising holding means adapted to be positioned over the fixed surface area, said holding means including a pair of rods formed in substantially square shape but open on one side thereof and disposed in spaced parallel planes, adjustable spacing means connected between said pair of rods so as to permit said rods to be positioned adjacent and on opposite sides of the hose, said adjustable spacing means being adapted when said holding means is in position to bear against the outermost surface of the hose for firmly applying a force inwardly on said hose to secure the hose to said fixed surface area over which the hose is draped when said holding means is in position, and spring means supported on at least one open end of each rod.

2. The clamping device as set forth in claim 1 wherein said spring means includes a hollow tubular cup adapted to be positioned on at least one open end of each rod and a compression spring supported within each of said cups, said compression spring having one end adapted to bear against the corresponding open end of each rod and its other end adapted to bear against the fixed surface area over which the hose is to be draped.

3. The clamping device as set forth in claim 1 wherein said spring means includes a hollow tubular cup slidingly positioned on at least one open end of each rod, the ends of said rod on which said tubular cups are positioned being beveled, a stop at one end of each hollow tubular cup cooperatively engaging the beveled end of each rod to limit the travel of said hollow tubular cup, a resilient bumper leg supported at the other end of each tubular cup and a compression spring positioned within each of said hollow tubular cups and adapted to bear against the inside surface of each of said bumper legs, the outside surface of said bumper legs being adapted to bear against the fixed surface area over which the hose is to be draped.

4. A clamping device adapted to clamp a permanently hooked end of a molded rubber drain hose to a fixed surface area over which the hooked end is draped comprising a substantially square shaped holding bracket open at one side and adapted to be positioned over the fixed surface area to which the hooked end of the hose is to be clamped, said holding bracket comprising a pair of rods disposed in spaced parallel planes, first and second adjustable cross-pieces connected between said pair of rods so as to be positioned adjacent the hose and on opposite sides of the fixed surface area when the clamping device is in its clamping position, said cross-pieces being adapted when said clamping device is in its clamping position to bear against the outermost surface of said hose for applying a force inwardly on said hose to firmly clamp the hose to the fixed surface area over which the hooked end of the hose is draped, said cross-pieces being formed of two relatively movable sections for varying the spacing between the rods and spring means supported on the open end of each rod and adapted to bear against the surface over which the hooked end of the hose is draped to cause said cross-pieces to apply a holding force inwardly against said hose from opposite sides of the surface area and automatically compensate for the hoses of varying sizes.

5. A clamping device as set forth in claim 4 wherein said two relatively movable sections are in telescopic engagement.

6. A clamping device as set forth in claim 4 wherein said two relatively movable sections are in sliding engagement.

References Cited by the Examiner

UNITED STATES PATENTS

| | | | |
|---|---|---|---|
| 2,095,170 | 10/37 | Conklin | 248—206 |
| 2,189,364 | 2/40 | Kirsten | 248—79 |
| 2,484,535 | 10/49 | Stader | 248—206 |
| 2,489,084 | 11/49 | Ducey | 248—226 |
| 2,544,986 | 3/51 | Dyer et al. | 248—76 |
| 2,611,568 | 9/52 | Yoder | 248—79 |
| 2,671,626 | 3/54 | Schmadeke | 248—75 |
| 2,865,588 | 12/58 | McCartney | 248—226 |
| 2,950,891 | 8/60 | Hage | 248—226 |
| 3,008,679 | 11/61 | Powell | 248—226 |
| 3,013,755 | 12/61 | Ittner | 248—75 |
| 3,126,182 | 3/64 | Stamper | 248—72 |
| 3,141,257 | 7/64 | Stull | 248—226 |

CLAUDE A LE ROY, *Primary Examiner.*

FRANK L. ABBOTT, *Examiner.*